(12) United States Patent
Kim et al.

(10) Patent No.: US 8,289,904 B2
(45) Date of Patent: Oct. 16, 2012

(54) METHOD FOR RECEIVING SYSTEM INFORMATION

(75) Inventors: Jeong Ki Kim, Anyang-Si (KR); Yong Ho Kim, Anyang-Si (KR); Ki Seon Ryu, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 490 days.

(21) Appl. No.: 12/664,316

(22) PCT Filed: Apr. 24, 2008

(86) PCT No.: PCT/KR2008/002331
§ 371 (c)(1),
(2), (4) Date: Dec. 11, 2009

(87) PCT Pub. No.: WO2008/153271
PCT Pub. Date: Dec. 18, 2008

(65) Prior Publication Data
US 2010/0177831 A1   Jul. 15, 2010

(30) Foreign Application Priority Data
Jun. 13, 2007   (KR) .................. 10-2007-0057971

(51) Int. Cl.
*H04Q 7/00*   (2006.01)
(52) U.S. Cl. .................................................... 370/328
(58) Field of Classification Search .................... None
See application file for complete search history.

(56) References Cited

U.S. PATENT DOCUMENTS

| | | | |
|---|---|---|---|
| 6,882,677 B2* | 4/2005 | Dehner et al. | 375/132 |
| 7,912,425 B2* | 3/2011 | Ihm et al. | 455/39 |
| 8,165,096 B2* | 4/2012 | Chin et al. | 370/332 |
| 2004/0260805 A1* | 12/2004 | Aoyama et al. | 709/224 |
| 2005/0254469 A1 | 11/2005 | Verma et al. | |
| 2006/0229075 A1* | 10/2006 | Kim et al. | 455/436 |
| 2006/0262751 A1* | 11/2006 | Vermola et al. | 370/331 |
| 2007/0253367 A1* | 11/2007 | Dang et al. | 370/329 |
| 2007/0275746 A1* | 11/2007 | Bitran | 455/509 |
| 2008/0170531 A1* | 7/2008 | Petry et al. | 370/312 |
| 2008/0298315 A1* | 12/2008 | Ihm et al. | 370/329 |
| 2009/0310477 A1* | 12/2009 | Lee et al. | 370/208 |
| 2010/0118772 A1* | 5/2010 | Cheng et al. | 370/328 |
| 2010/0177831 A1* | 7/2010 | Kim et al. | 375/259 |
| 2011/0098069 A1* | 4/2011 | Son et al. | 455/507 |

FOREIGN PATENT DOCUMENTS

| | | |
|---|---|---|
| KR | 10-2001-0045616 A | 6/2001 |
| KR | 10-2003-0094973 A | 12/2003 |
| WO | WO-02/27973 A1 | 4/2002 |

* cited by examiner

*Primary Examiner* — Michael J Moore, Jr.
*Assistant Examiner* — Prenell Jones
(74) *Attorney, Agent, or Firm* — Birch, Stewart, Kolasch & Birch, LLP

(57) ABSTRACT

A method for a mobile station (MS) to acquire system information of other communication systems via an initial entry communication system in which the mobile station (MS) initially enters via a base station (BS) is disclosed. The BS can deliver system information using a message transmitted to the MS at each frame or at intervals of a periodic time. In other words, the BS delivers specific information indicating whether the system is supported or not in a message. If the system is supported, the BS transmits a message including the system information to the MS. During or after the initial entry, the BS may deliver the system information using messages communicated with the MS. Namely, the BS can voluntarily or on the MS' demand transmit a message including the system information to the MS indicating whether the system is supported.

7 Claims, 12 Drawing Sheets

METHOD FOR RECEIVING SYSTEM INFORMATION

TECHNICAL FIELD

The present invention relates to a communication system, and more particularly to a method for receiving system information by a communication system.

BACKGROUND ART

FIG. 1 is a flow chart illustrating a network entering process when a mobile station (MS) for a broadband wireless access system is initiated.

(1) If the mobile station (MS) is initially powered on, it searches for a downlink channel, and acquires downlink synchronization from a base station. In this case, the mobile station (MS) receives a downlink-MAP (DL-MAP) message, an uplink-MAP (UL-MAP) message, a downlink channel descriptor (DCD) message, and an uplink channel descriptor (UCD) message, such that it acquires UL/DL channel parameters, and can establish UL/DL synchronization using UL/DL channel parameters.

(2) The mobile station (MS) performs ranging with the base station (BS) to adjust uplink transmission parameters, and receives a basic management CID and a primary management CID from the base station (BS).

(3) The mobile station (MS) negotiates with the base station (BS) about the basic performance.

(4) The base station (BS) authenticates the mobile station (MS).

(5) The mobile station (MS) is registered in the base station (BS). The mobile station (MS) managed by an Internet Protocol (IP) receives a secondary management CID from the base station (BS).

(6) IP connection is established.

(7) A current date and a current time are established.

(8) Configuration files of the mobile station (MS) are downloaded from a TFTP server.

(9) Connection for a prepared service is established.

In a network entering process during the above-mentioned MS initiation, if the base station (BS) supports at least two communication systems, there is needed a method for entering one communication system, and then entering the other communication systems through the one communication system.

Disclosure

Technical Problem

Accordingly, the present invention is directed to a method for receiving system information that substantially obviates one or more problems due to limitations and disadvantages of the related art.

An object of the present invention is to provide a method for allowing a base station (BS) which supports at least two communication systems to provide system information.

Technical Solution

To achieve these objects and other advantages and in accordance with the purpose of the invention, as embodied and broadly described herein, a method for receiving system information from a base station (BS) which supports a first communication system and a second communication system comprising: a) searching for a frequency band of the first communication system, and receiving a frame control header (FCH) including specific information which indicates whether the second communication system is supported or not; and b) upon receiving the specific information indicating that the second communication system is supported, receiving system information of the second communication system.

Preferably, the step b) of receiving the system information includes: receiving the system information via a downlink MAP message.

Preferably, the FCH includes count information indicating which one of downlink MAP messages includes the system information of the second communication system.

Preferably, the count information is firstly set to an initial value, such that it is reduced by '1' whenever a downlink MAP message is transmitted, and if the count information is set to '0', it is reset to the initial value at the next frame of a frame at which the FCH is received.

Preferably, the initial value is associated with a transmission (Tx) period of the system information associated with the second communication system.

Preferably, the method further comprises, if the 'Count' value is set to '0', receiving the system information via a downlink MAP message of a frame at which the FCH is received.

Preferably, the step b) for receiving the system information includes: receiving the system information via a downlink channel descriptor (DCD) message.

Preferably, the downlink channel descriptor (DCD) message includes second information indicating that the system information of the second communication system has been changed.

Preferably, the step b) for receiving the system information includes: receiving the system information via at least one of a ranging response message, a basic capability response message, a system information response message, and an authentication message.

Preferably, the system information includes at least one of downlink center frequency information, base bandwidth information, information indicating the number of base bandwidths, FFT size information, cyclic prefix information, frame duration code information, which are used in the second communication system.

Preferably, the step b) for receiving the system information includes: receiving, by the base station (BS), the system information using at least one of a broadcast scheme, a multicast scheme, and a unicast scheme.

In another aspect of the present invention, there is provided a method for allowing a mobile station (MS) to receive system information from a base station (BS) which supports a first communication system and a second communication system comprising: searching for, by the mobile station (MS), a frequency band of the first communication system, and receiving a frame control header (FCH) including first information which indicates whether the second communication system is supported or not; upon receiving the first information indicating that the second communication system is supported, transmitting, by the mobile station (MS), a specific message including second information indicating that the second communication system is supported; and receiving system information of the second communication system as a response to the specific message.

Preferably, the specific message includes at least one of a ranging request message, a basic capability request message, a system information request message, and an authentication message.

Preferably, the method further comprises, if the system information of the second communication system is changed, receiving a system-information change message including the changed system information.

Preferably, the system information includes at least one of downlink center frequency information, base bandwidth information, information indicating the number of base bandwidths, FFT size information, cyclic prefix information, frame duration code information, which are used in the second communication system.

It is to be understood that both the foregoing general description and the following detailed description of the present invention are exemplary and explanatory and are intended to provide further explanation of the invention as claimed.

Advantageous Effects

The above-mentioned embodiment of the present invention has the following effects.

The present invention can initially enter a communication system. The present invention can acquire system information from other communication systems via the entrance communication system. Therefore, the present invention may also enter other communication systems via the acquired system information.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings. Wherever possible, the same reference indexes will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

Figure 1:
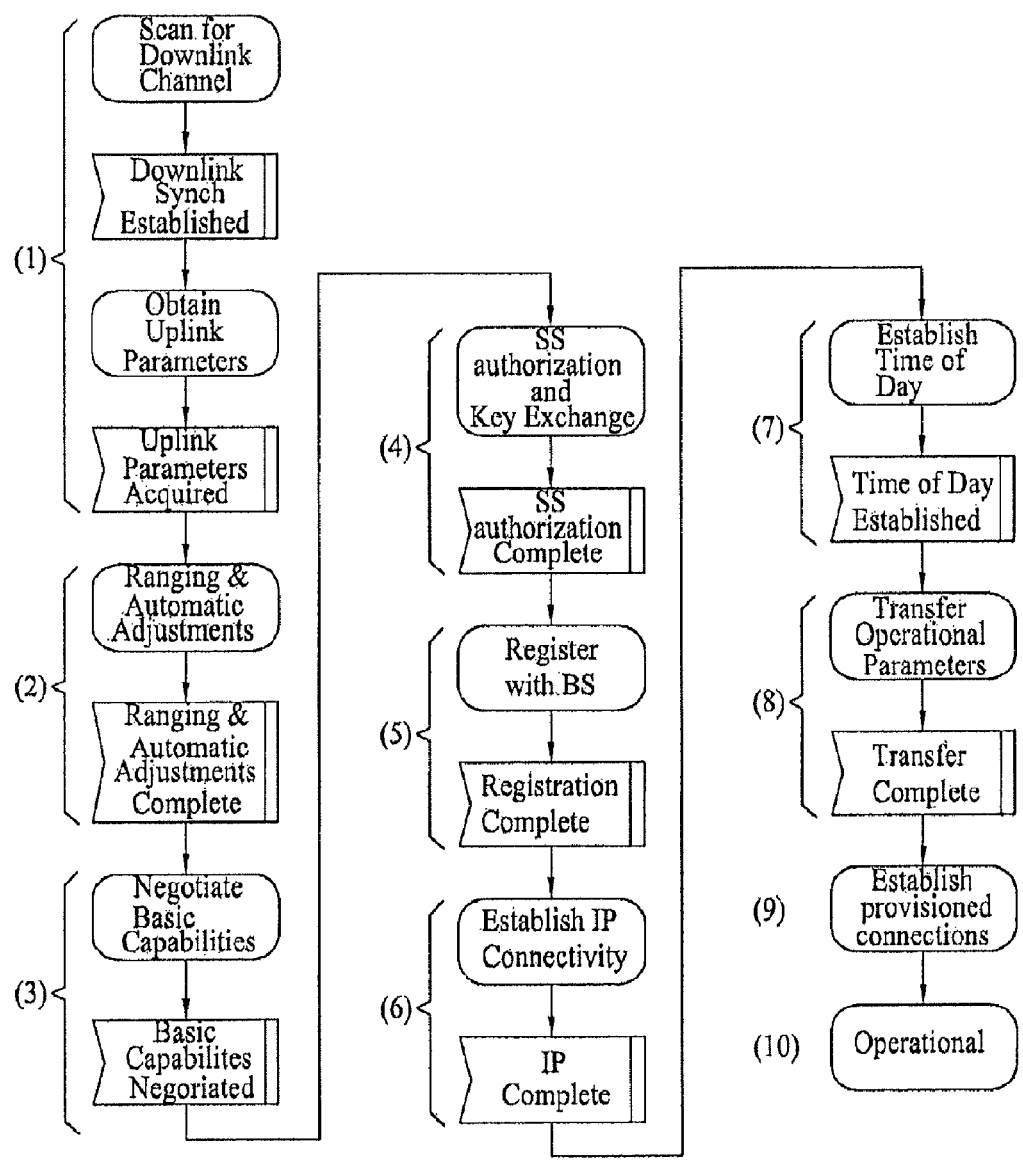
FIG. 1 is a flow chart illustrating a network entering process when a mobile station (MS) for a broadband wireless access system is initiated.
Figure 2:
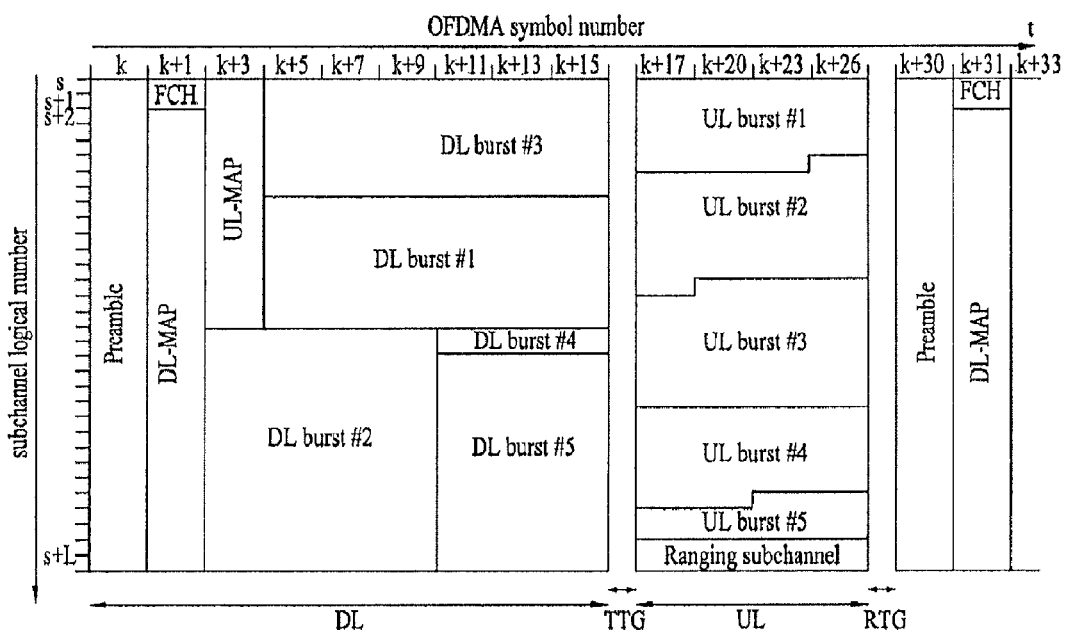
FIGS. 2~5 show exemplary frame structures for use in the broadband wireless access system according to the present invention.

FIG. 2 is a frame structure for use in the broadband wireless access system according to the present invention.

The logical frame structure for use in the broadband wireless access system may include a preamble, a frame control header (FCH), a DL/UL-MAP, and a data burst, as depicted in FIG. 2, In this case, the frame includes a plurality of data sequence channels, which are generated by physical characteristics during a predetermined period of time, and may include a downlink sub-frame and an uplink sub-frame. The preamble contained in the above-mentioned frame is specific sequence data located at a first symbol of each frame, and is used to establish synchronization between the mobile station (MS) and the base station (BS) or to perform channel estimation. The FCH is used to provide either channel allocation information associated with the DL-MAP or channel coding information. The DL-MAP/UL-MAP message is a MAP message which informs the mobile station (MS) of channel resource allocation at a DL/UL. And, the burst is indicative of a unit of data which is transmitted to or received in a single mobile station (MS). The data burst can be distinguished from each other according to categories of transmission data (i.e., downlink Tx data or uplink Tx data), and may be transmitted at intervals of a predetermined frame time within a frame. Also, the ranging sub-channel is allocated to the uplink Tx data allocation frame area, such that it may transmit the ranging signal. The size and location of the above burst can be recognized by the DL-MAP/UL-MAP messages. The DCD/UCD messages (not shown in FIG. 2) may be periodically transmitted as the MAC messages indicating physical characteristics of the DL/UL channels over the DL/UL channels.

If the mobile station (MS) is initialized as shown in the above-mentioned method or misses the signal for the base station (BS), it may perform the process for acquiring a downlink channel. In this case, the mobile station (MS) stores parameters, which have been finally operated, and at the same time acquires the downlink channel. If the mobile station (MS) fails to acquire the downlink channel using the last parameters, it will continuously search for other downlink channels until searching for valid downlink signals.

If synchronization of a physical (PHY) channel has been established, the MAC layer of the mobile station (MS) may attempt to acquire UL/DL channel control parameters. The mobile station (MS) receives the DL-MAP message to establish MAC synchronization, and successfully receives the DL-MAP message and the DCD message, such that it maintains the MAC synchronization. After establishing the downlink synchronization, the mobile station (MS) waits for receiving the UCD message from the base station (BS) to acquire uplink-channel transmission parameters. In the broadband wireless access system, the mobile station (MS) periodically receives the DCD/UCD messages from the base station (BS), such that it may maintain channel synchronization.

Data transmission of each user may be defined as different permutation sub-carrier allocation methods (e.g., PUSC, FUSC, TUSC, AMC, etc.) while being classified according to sub-channel configuration methods, and may be composed of various zones of a single frame.

Figure 3:
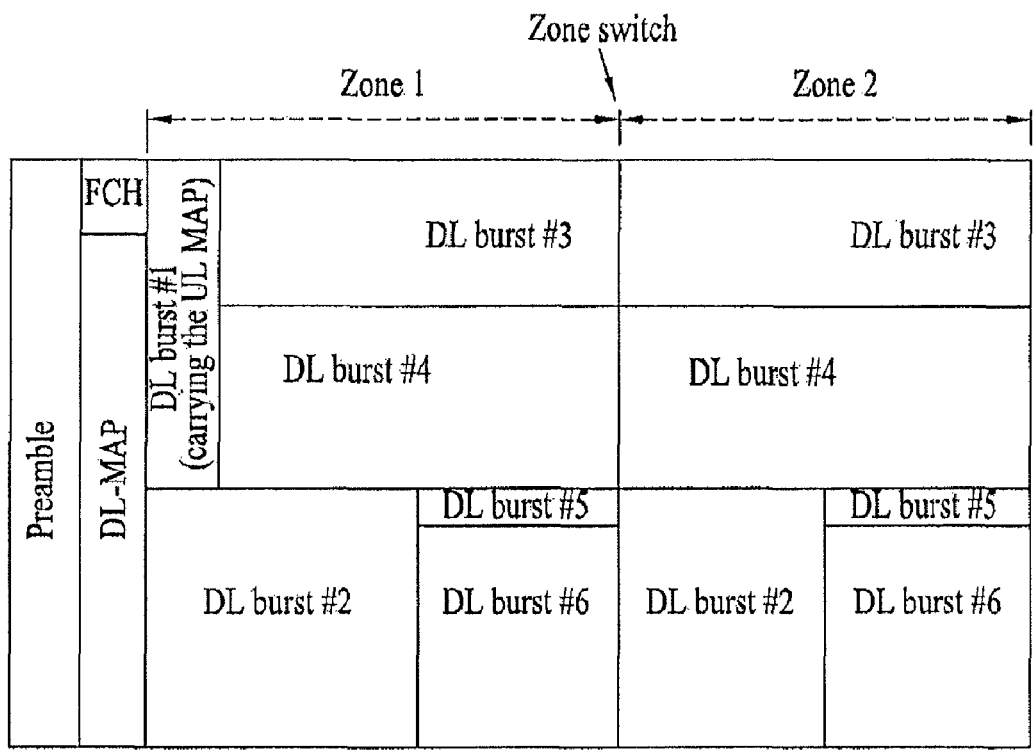

FIG. 3 explains the relationship between a frame structure and zones for use in a broadband wireless access system according to the present invention.

In this case, the zones are defined to discriminate Tx data units based on different permutation rules. In other words, data units contained in different zones use different permutations. Permutation means allocating data units, which are coded and modulated by the orthogonal frequency division multiple access (OFDMA) system, to individual sub-carriers.

A variety of permutation methods can be used, for example, a Full Usage of Sub-Carrier (FUSC) scheme, a Partial Usage of Sub-Carrier (PUSC) scheme, and an Adaptive Modulation and Coding (AMC) scheme. In more detail, the FUSC scheme considers sub-carriers contained in a transmission unit to be an entire part, such that data units are allocated to individual sub-carriers. The PUSC scheme divides each sub-carrier contained in the transmission (Tx) unit into one or more parts, such that the divided sub-carriers may be partially allocated. The AMC scheme selects the band having a good channel status, and may perform selective allocation on the selected band.

According to the permutation rules, pilot positions of individual zones, a tile, which may be composed of 12 sub-carriers, and data (e.g., a bin), which may be composed of 9 sub-carriers, may be mapped to the sub-carriers, or a method for deciding a single slot may be applied in different ways. For example, the FUSC scheme of the downlink may implement a single sub-carrier for each symbol, or the PUSC scheme may implement a single sub-carrier per two symbols.

Figure 4:
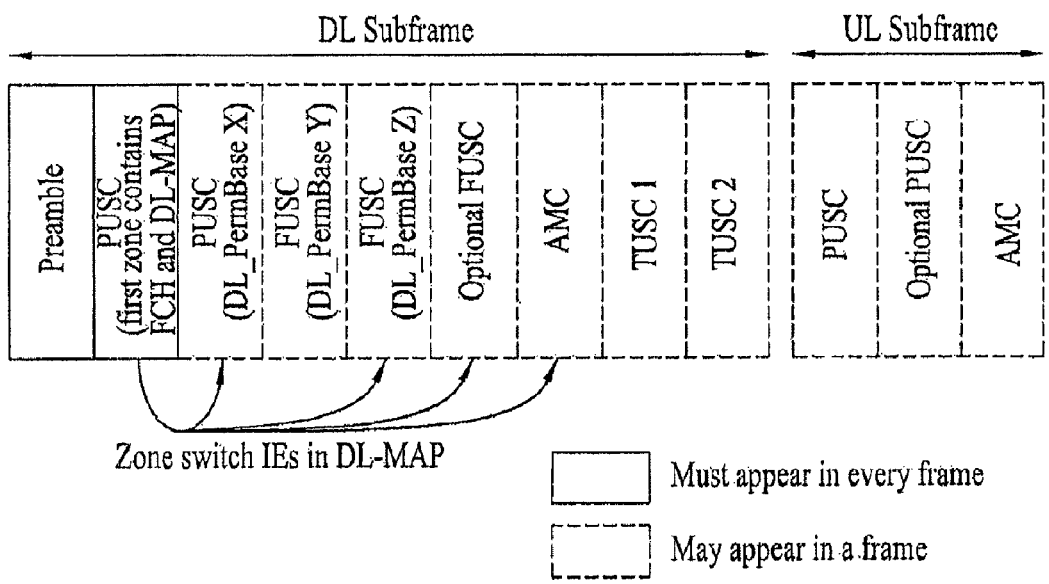

FIG. 4 shows an exemplary frame structure composed of multiple permutation zones.

The zone for each frame basically begins with the PUSC (like a DL or UL) scheme. Referring to FIG. 4, the frame zones may be multiplexed so that PUSC(DL-PermBase X) scheme, PUSC(DL-PermBase Y) scheme, FUSC(DL-PermBase Z) scheme, Optional FUSC AMC TUSC1 scheme, and Optional FUSC AMC TUSC2 scheme are sequentially applied for downlink transmission, and PUSC scheme, Optional PUSC, and AMC scheme are sequentially applied for uplink transmission. In this way, the frame zones may be multiplexed. If a zone for a mobile station (MS) is changed to another zone, the base station (BS) can notice to the mobile station using zone switch IE of DL-MAP that the zone has been changed. The mobile station (MS) can recognize the permutation method by the zone switch IE of the DL-MAP message. In a downlink, ASS_DL_IE or TD_ZONE_IE message may be used as a zone switch IE. In an uplink, AAS_UL_IE or ZONE_IE message may be used as a zone switch IE. If the base station (BS) needs to use another permutation as described above, the DL-MAP or UL-MAP message containing a zone switch IE may be used for transmission. As can be seen from FIG. 4, the zone is divided into several parts with respect to time axis (or symbol axis), such that the mobile station (MS) can recognize status information of a current zone, and a downlink burst can be allocated according to the recognized status information.

The present invention relates to a synchronization setup method for use in a broadband wireless access system. The synchronization setup method according to the present invention relates to a method for a base station (BS) to inform a mobile station (MS), which attempts to enter a network, if a new system is provided and a structure of a new system, and a method for a base station (BS) to inform the mobile station (MS) the system information when the new system is accessed. This system information may be informed to a mobile station (MS) by unicasting or broadcasting.

In order to increase or improve the performance of the broadband wireless access system, the standardization for the new wireless access system (e.g., IEEE 802.16m) has begun. The new wireless access system should be designed to support the conventional wireless access system.

The following embodiments of the present invention may consider all the above-mentioned communication systems. Specifically, the following embodiments will consider IEEE 802.16e/m communication system, such that they enable the mobile station (MS) to access the frequency band of IEEE 802.16e communication system, and acquire system information of IEEE 802.16m system. IEEE 802.16e communication system will hereinafter be referred to as "16e", and the IEEE 802.16m communication system will hereinafter be referred to as "16m".

Figure 5:
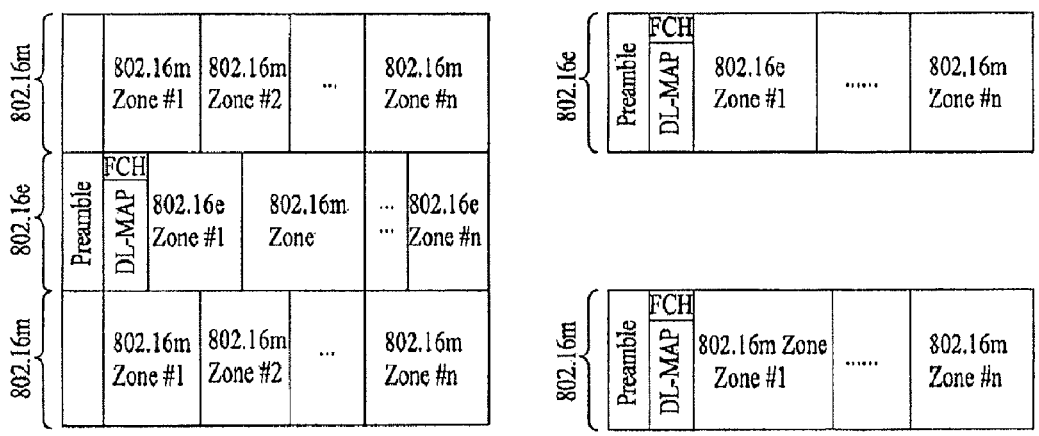

FIG. 5 shows exemplary available frame structures used when at least two wireless access systems are supported. In the following explanation, the IEEE 802.16e communication system and the IEEE 802.16m communication system will hereinafter be used as examples of the at least two wireless access systems.

FIG. 5A shows an exemplary frame structure available for the base station (BS) in which the 16e system and the 16m system use the same center frequency. FIG. 5B shows exemplary frame structure available for the base station (BS) in which the 16e system and the 16m system use different center frequencies.

As can be seen from FIG. 5A, when the same center frequency is used, the present invention can use a specific frame in which the frame of the 16e system is set to an center frequency and the frame of 16m system is arranged on the upper and lower frequency bands of the above 16e's frame.

While or after the mobile station (MS) enters the 16e system by receives preamble, FCH, and DL-MAP messages from the 16e system using the 16e's center frequency information, it may enter the 16m system by receiving the above-mentioned 16m's system information (e.g., frame structure information). Provided that the 16e system and the 16m system use the same center frequency, although additional preamble, FCH, and DL-MAP messages of the 16m system are not transmitted, the mobile station (MS) may enters the 16m system using the preamble, FCH, and DL-MAP messages of the 16e system.

As can be seen from FIG. 5B, provided that different center frequencies are used for each of the 16m system and 16e system, a center frequency which is different from that of the 16e system is set for the 16m system, and then a frame for the 16m may be set around a specific frequency band around the 16m system's center frequency.

In this case, while or after the mobile station (MS) receives the preamble, FCH, and DL-MAP messages from the 16e system using the 16e's center frequency information, it can enter the 16e system by receiving the above-mentioned 16m's system information (e.g., frame structure information). However, provided that the 16e system and the 16m system use different center frequencies, additional preamble, FCH, and DL-MAP messages of the 16m system, it is preferable that additional preamble, FCH, and DL-MAP messages of the 16m system be transmitted in consideration of directly entering the 16m system.

As described above, when the mobile station (MS) initially enters the network of the base station (BS) (i.e., before the initial network entry process is completed), the mobile station (MS) can receive the 16m system information from the base station (BS) according to the broadcast, multicast, or unicast scheme. Also, after the initial network entry is completed, the mobile station (MS) can receive the 16m system information from the base station (BS) according to the above-mentioned broadcast, multicast or unicast scheme.

The following embodiments of the present invention will hereinafter describe a method for allowing the mobile station (MS) to acquire the 16m system information from the base station (BS). In the following description, it is assumed that the 16m base station (BS) can support the 16m mobile stations or the 16e mobile stations.

According to a first method, the 16m mobile station (MS) searches for the 16m frequency band using its own information in a similar way to the conventional 16e system, such that it establishes a connection to the 16m base station (BS). According to a second method, the 16m mobile station (MS) first searches for the 16e frequency band to find a base station, and then establishes a connection to the base station by acquiring information related to the 16m. The present invention relates to a method for acquiring 16m system information using the second method, and associated embodiments 1)~6) are as follows.

1) The base station (BS) can transmit the 16m system information to the mobile stations (MSs) using the DL-MAP message (Broadcast Scheme).

2) The base station (BS) can transmit 16m system information to the mobile stations using the DCD message (Broadcast scheme).

3) The mobile station (MS) can receive 16m system information from the base station (BS) using the RNG-REQ/RSP message during the ranging process between the mobile station (MS) and the base station (BS) (Unicast Scheme).

4) The mobile station (MS) can receive 16m system information from the base station (BS) using the SBC-REQ/RSP message when negotiating with the base station (BS) about the basic capability (Unicast scheme).

5) The mobile station (MS) can receive 16m system information from the base station (BS) using a system information request message such as a 16m system information request message (16m_Info-REQ/RSP) (Unicast scheme).

6) The mobile station (MS) can receive 16m system information from the base station (BS) using a authentication procedure message (PKM-REQ/RSP) (Unicast scheme).

The above-mentioned embodiments can be classified into a broadcast or unicast scheme. En other words, if the DL-MAP message or the DCD message is used, the system information is transmitted according to the broadcast scheme. In the case where request/response messages (e.g., RNG-REQ/RSP, SBC-REQ/RSP, 6m_Info-REQ/RSP message, and PKM-REQ/RSP messages) are used, the system information is transmitted according to the unicast scheme.

The above-mentioned embodiments will hereinafter be described in detail.

One embodiment of the present invention will hereinafter be described in detail, wherein a base station transmits the 16m system information to mobile stations using DL-MAP message.

The following table 1 shows an example of the DL_frame_prefix format used when the base station (BS) transmits the 16m system information using the DL-MAP message. The DL_frame_prefix format is a data structure transmitted at a beginning part of each frame, and it is mapped to a FCH channel with including information of a current transmission frame.

TABLE 1

| Syntax | Size | Note |
|---|---|---|
| DL_Frame_Prefix_format( ){ | — | — |
| Used subchannel bitmap | 6 bits | Bit #0: Subchannels 0-11 are used Subchannel group 0<br>Bit #1: Subchannels 12-19 are used Subchannel group 1<br>Bit #2: Subchannels 20-31 are used Subchannel group 2<br>Bit #3: Subchannels 32-39 are used Subchannel group 3<br>Bit #4: Subchannels 40-51 are used Subchannel group 4<br>Bit #5: Subchannels 52-59 are used Subchannel group 5 |
| 16m_Support_Indicator | 1 bits | 0b0: BS shall not supports 16m<br>0b1: BS shall supports 16m |
| Repetition_Coding_Indication | 2 bits | 0b00: No repetition coding on DL-MAP message<br>0b01: Repetition coding of 2 used on DL-MAP message<br>0b10: Repetition coding of 4 used on DL-MAP message<br>0b11: Repetition coding of 6 used on DL-MAP message |
| Coding_Indication | 3 bits | 0b000: CC encoding used on DL-MAP message<br>0b001: BTC encoding used on DL-MAP message<br>0b010: CTC encoding used on DL-MAP message<br>0b011: ZT CC encoding used on DL-MAP message<br>0b100: CC encoding with optional interleaver<br>0b101: LDPC encoding used on DL-MAP message<br>0b101 0b110 to 0b111 - Reserved |
| DL-MAP message Length | 8 bits | |
| If( 16m_Support_Indicator = = 1 ) { | — | — |
| Count | 4 bits | 'Count'indicates which one of the next DL-MAP messages will include the16m PHY profiles. If the DL-MAP message of the current frame includes the 16m PHY profile, 'Count' may be set to '0'. If the base station (BS) transmits the 16m PHY profile at intervals of a frame, 'Count' may also be set to "0." |
| } else { | — | — |
| Reserved | 4 bits | |
| } | — | — |
| } | | |

As can be seen from Table 1, the base station (BS), to which the mobile station (MS) attempts to access via a FCH channel, transmits specific information indicating whether the base station (BS) supports the 16m communication system to the mobile station (MS). The above-mentioned specific information indicating whether the base station (BS) supports the 16m system is transmitted to the mobile station (MS) via the 16m_Support_Indicator field, as shown in Table 1.

The mobile station (MS) receives the FCH signal and checks the 16m_Support_Indicator field to determine whether the base station (BS) supports the 16m communication system. If it determines that the base station (BS) supports the 16m system, the mobile station (MS) receives system information associated with the 16m communication system, such that it may communicate with the base station (BS) according to the 16m communication scheme.

The mobile station (MS) receives the 16m system information, such that it may establish synchronization with the base station (BS). The mobile station (MS) can acquire the 16m system information from the base station (BS) using the broadcast scheme or unicast scheme. As one of broadcast schemes, a method of using DL-MAP message IE will hereinafter be described in detail.

The mobile station (MS) detects a preamble by checking the 16e frequency band, and receives the FCH, and then checks 16m_Support_Indicator field of FCH, such that it can recognize whether the base station (BS) supports the 16m system. As can be seen from Table 1, if the 16m_Support_Indicator message of the FCH is set to '1' (i.e., 16m_Support_Indicator=0b1), the mobile station (MS) determines that the DL-MAP message includes the 16m system information, and checks the value of the 'Count' field.

The 'Count' value is a frame offset value indicating after how many frames from the current frame the 16m system information is located. The base station (BS) sets the 'Count' value to an initial value, and then the 'Count' value is reduced by '1' whenever the DL-MAP message is transmitted. If the 'Count' value of the current frame is set to '0', the base station (BS) resets the 'Count' value at the next frame. In other words, if the 16m system information is periodically transmitted, the initial value of the 'Count' may be periodic information which indicates the period of transmission of the 16m system information.

Therefore, if the 'Count' value is set to '0' (i.e., Count=0b0000), the mobile station (MS) determines that the 16m system information is contained in the DL-MAP message of the current frame. If the 'Count' value is set to "n" instead of '0', the mobile station (MS) determines that the 17m system information will be included in a DL-MAP message that will be received after N frames. Provided that the base station (BS) includes the 16m system information in each frame and transmits the resultant frame, the 'Count' value will always be set to '0'. By receiving a FCH signal and using a 'Count' field, a mobile station (MS) can determine which DL-MAP message will include the 16m system information, resulting in an increased Rx capability. Also, if the 'Count' value is not '0', the mobile station (MS) may power off or reduce its power until receiving the frame in which the 'Count' value is set to '0', such that an amount of power consumption can be minimized.

The following table 2 shows an example of extended DIUC codes used when the base station (BS) transmits the 16m system information to the mobile stations via the DL-MAP message.

TABLE 2

| Extended DIUC (hexadecimal) | Usage |
|---|---|
| 00 | Channel_Measurement_IE |
| 01 | STC_Zone_IE |
| 02 | AAS_DL_IE |
| 03 | Data_location_in_another_BS_IE |
| 04 | CID_Switch_IE |
| 05 | 16m_PHY_profiles |
| 06 | MIMO_DL_Enhanced_IE_reserved |
| 07 | HARQ_MAP_Pointer_IE |
| 08 | PHYMOD_DL_IE |
| 09-0A | Reserved |
| 0B | DL PUSC Burst Allocation in Other Segment |
| 0C | PUSC ASCA ALLOC IE |
| 0C 0D-0E | Reserved |
| 0F | UL_interference_and_noise_level_IE |

As can be seen from Table 2, the extended DIUC code value of 06 is assigned, such that the 16m system information (i.e., 16m PHY profiles) be contained in the DL-MAP message in the form of the DL_MAP message IE. This code value may also be changed to another value (e.g., 09~0A or 0C~0E) according to individual situations.

The following table 3 shows an example of 16m_PHY_Profile IE message including the 16m PHY profile (i.e., 16m system information). In this case, the extended DIUC code value of 05 is allocated to the 16m PHY_Profile_IE message.

TABLE 3

| Syntax | Size | Notes |
|---|---|---|
| 16m_PHY_profile_IE( ){ | | |
| Extended DIUC | 4 bits | mPHY_Profile = 0x05 |
| Length | 4 bits | Length = 0x0x |
| Frequency | 32 bits | 16m Downlink center frequency (kHz) |
| Base bandwidth | 8 bits | Channel BW in units of 125 Khz |
| FFT Size | 2 bits | 0b00 = 2048 |
| | | 0b01 = 1024 |
| | | 0b10 = 512 |
| | | 0b11 = 128 |
| Cycle prefix (CP) | 2 bits | 0b00 = $\frac{1}{4}$ |
| | | 0b01 = $\frac{1}{8}$ |
| | | 0b10 = $\frac{1}{16}$ |
| | | 0b11 = $\frac{1}{32}$ |
| Frame duration code | 4 bits | 0b0000 = 2.0 ms |
| | | 0b0001 = 2.5 ms |
| | | 0b0010 = 4 ms |
| | | 0b0011 = 5 ms |
| | | 0b0100 = 8 ms |
| | | 0b0101 = 10 ms |
| | | 0b0110 = 12.5 ms |
| | | 0b0111 = 20 ms |
| | | 0b1000-0b1111 = Reserved |
| Number of band | 4 bits | The number of bandwidth |
| Preamble Index | 8 bits (or variable) | This parameter defined the PHY specific preamble. (If the 16m''s IDcell and Index are changed to others, the size may be changed) |
| Reserved | 4 bits (variable) | "Reserved" may be deleted or modified according to IE size. |
| } | | |

As can be seen from Table 3, it can be recognized that the 16m system information includes "Frequency", "Base bandwidth", "FFT Size", "Cycle prefix", "Frame duration code", "Number of band" and "Preamble Index" fields, etc.

The "Frequency" field includes a downlink center frequency used by the 16m system. The "Base bandwidth" field includes basic bandwidth information used by the base station (BS). The "Number of Band" field includes a total number of basic bandwidths used by the base station (BS). For example, if the base station (BS) uses four 10 MHz-bandwidths, the basic bandwidth is 10 MHz and the total number of bandwidths is "four". Then, information indicating "10 Mhz" will be included in the "Base bandwidth" field, and information indicating that a total number of bandwidths is "4" will be included in the "Number of Band" field. The "FFT Size" field includes FFT size information associated with the above-mentioned basic bandwidth. The "Cyclic Prefix" field includes cyclic prefix information for use in the 16m system. The "Frame duration code" field includes values used in the system, including frame transmission period information. Information contained in "16m_PHY_profile IE" shown in Table 3 may be added, deleted or modified as necessary.

Figure 6:
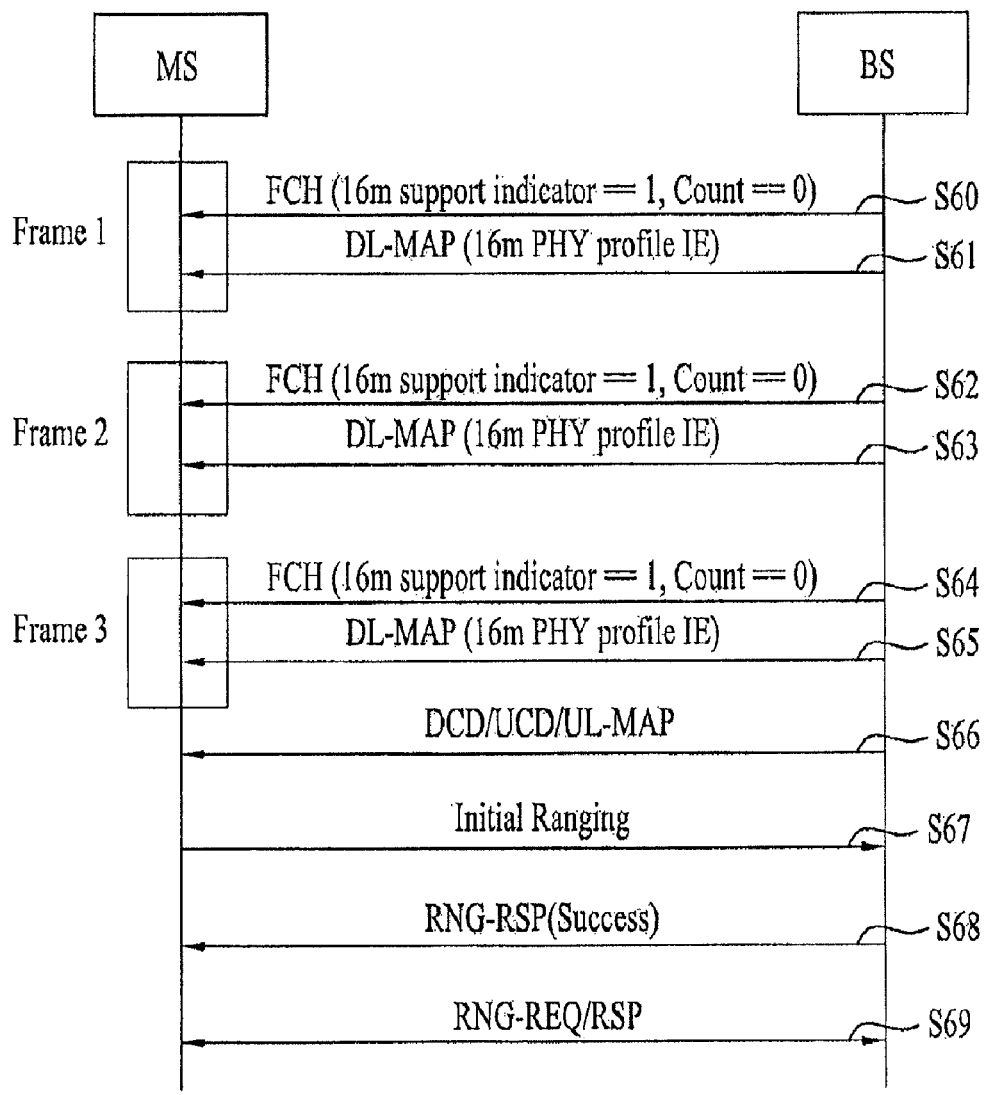
FIG. 6 is a flow chart illustrating a method for using the DL-MAP message according to one embodiment of the present invention.

FIG. 6 is a flow chart illustrating a method for using the DL-MAP message according to one embodiment of the present invention.

FIG. 6 shows a method for a 16m mobile station to acquire the 16m system information from the base station (BS), while entering the 16m network supporting the 16e system. Specifically, according to the following embodiments of FIG. 6, the base station (BS) transmits the 16m system information to the mobile stations via the DL-MAP message every frame. When the mobile stations receive the DL-MAP message, it can acquire the 16m system information, and performs the remaining network entry processes.

First, at step S60, the mobile station (MS) checks the 16e frequency band to detect the preamble, and then receives the FCH signal. The mobile station (MS) checks the "16m_Support_Indicator" field of the received FCH signal, and determines whether the 16m communication system is supported or not. In this case, if the 16m communication system is supported as shown in Table 1, the "16m_Support_Indicator" field is set to '1'. Otherwise, if the 16m communication system is not supported, the "16m_Support_Indicator" field is set to '0'. Therefore, if the mobile station (MS) receives the FCH signal in which the 16m_Support_Indicator field is set to "16m_Support_Indicator=0b1" and the 'Count' field is set to "count=0", it can be recognized that the base station (BS) supports the 16m communication system and that the DL-MAP message transmitted from the current frame (i.e., frame 1) includes 16m system information.

At step S61, the mobile station (MS) receives the DL-MAP message, and acquires 16m system information contained in the DL-MAP message. In this case, the 16m system information contained in the DL-MAP message may be configured in the form of 16m_PHY_profile IE of Table 3.

Steps S62 and S63 are similar to the above steps S60 and S61, and relate to transmission of the next frame (i.e., frame 2) of the frames which have been transmitted at the above steps S60 and S61. Also, steps S64 and S65 are similar to the above steps S60 and S61, and relate to transmission of the next frame (i.e., frame 3) of the frames which have been transmitted at the above steps S62 and S63. In this embodiment, as the 16m system information is transmitted at every frame, the FCH signal transmitted at the above step S61 or S63 sets "16m_Support_Indicator" to "0b1" (i.e., 16m_Support_Indicator=0b1) or sets 'Count' to '0'(i.e., count=0).

In this way, according to the embodiment of FIG. 6, the base station (BS) broadcasts 16m system information to the mobile stations via the DL-MAP message at intervals of a frame. The mobile station (MS) can acquire the 16m system information contained in the DL-MAP message received at intervals of a frame.

At step S66, the mobile station (MS) receives DCD, UCD, and UL-MAP messages from the base station (BS) via channel resource allocation information acquired from the DL-MAP message which has received at the above-mentioned steps.

In other words, the mobile station (MS) receives the DL-MAP message, and performs the MAC synchronization, and continuously receives the DL-MAP and UCD messages from the base station (BS), such that it maintains the MAC synchronization. In this way, after performing the downlink synchronization, the mobile station (MS) can receive UCD message from the base station (BS) so as to acquire transmission parameters associated with an uplink channel. In a communication system, the mobile station (MS) can maintain channel synchronization upon periodically receiving the DCD/UCD message from the base station (BS).

At steps S67 and S68, the mobile station (MS) transmits a ranging request message (CDMA ranging code) for initial ranging, and receives a response message to the ranging request message. In this case, "Ranging" is the set of processes executed to not only acquire synchronization between the mobile station (MS) and the base station (BS) but also perform the power control. Specifically, the initial ranging indicates that an initial timing synchronization capable of allowing the initial timing of the mobile station (MS) to be equal to that of the base station (BS) is conducted. Specifically, the initial ranging is for a initial timing synchronization to adjust the initial timing of a mobile station (MS) to be aligned with the timing of the base station (BS).

At step S69, after the synchronization is conducted by the initial ranging process, the mobile station (MS) includes the MAC address in the ranging request message, and transmits the resultant MAC address to the base station (BS), such that it receives the basic management CID and the primary management CID from the base station (BS) via the ranging response message.

Figure 7:
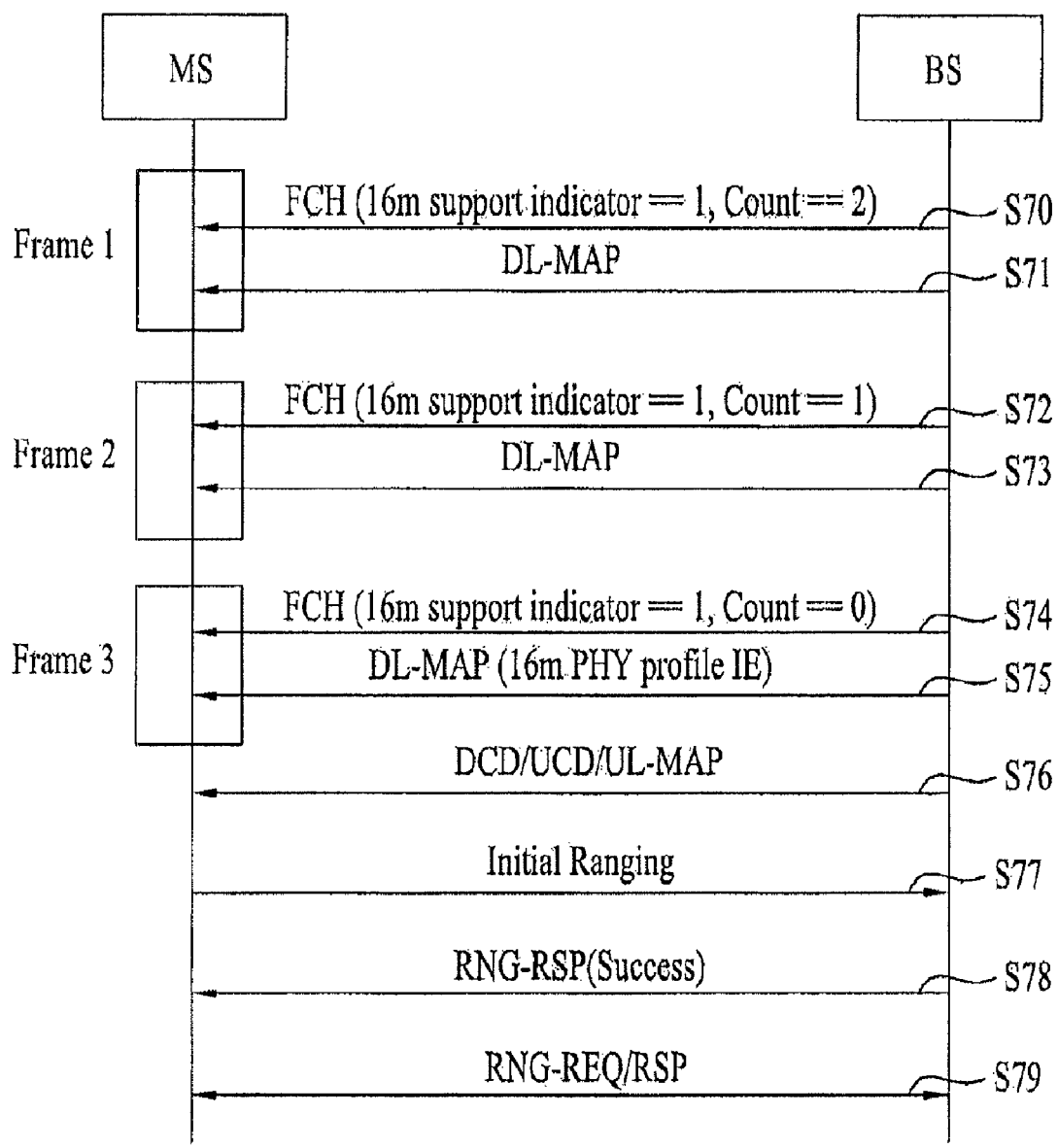
FIG. 7 a flow chart illustrating a method for using the DL-MAP message according to another embodiment of the present invention.

FIG. 7 shows a flow chart illustrating a method for using the DL-MAP message according to another embodiment of the present invention.

FIG. 7 shows a method for acquiring the 16m system information from the base station (BS) during the network entry process between the 16m mobile station (MS) and the 16m base station (BS) supporting the 16e system, in the same manner as in FIG. 6. However, the method of FIG. 7 is different from that of FIG. 6 in that the base station (BS) periodically transmits the 16m system information to the mobile stations.

First, at step S70, the mobile station (MS) checks the 16e frequency band to detect a preamble, and then receives the FCH signal. The mobile station (MS) checks the "16m_Support_Indicator" field of the received FCH signal, and determines whether the 16m communication system is supported or not. In this case, it is assumed that the "16m_Support_Indicator" field is set to '1' when the 16m communication system is supported as shown in Table 1. Otherwise, it is assumed that the "16m_Support_Indicator" field is set to '0' when the 16m communication system is not supported. In addition, it is assumed that the initial value of the 'Count' value is set to "2". Therefore, the base station (BS) sets "16m_Support_Indicator=0b1" and "count=0", and transmits the FCH signal. The mobile station (MS) receiving the FCH signal configured in above manner can recognize that the base station (BS) which the mobile station (MS) is currently entering supports the 16m communication system and the DL-MAP message transmitted from a specific frame located behind two frames from a current frame (i.e., frame 1) will transmit the 16m system information. Therefore, the mobile station (MS) receives the DL-MAP message having no 16m system information at step S71.

At step S72T, the mobile station (MS) receives the FCH signal in the same manner as in the above step S70. Compared with the above step S70, there is a difference in 'Count' value between steps S72 and S70. In other words, the 'Count' value is set to an initial value as shown in Table 1, and is then reduced by '1' by the next frame transmission. In other words, according to this embodiment of the present invention, the 'Count' value is set to "count==1", such that the initial value "2" is reduced by '1' and the resultant 'Count' value is set to '1'. The mobile station (MS) receiving the above FCH signal set up in this manner can recognize that a current entry base station (BS) supports the 16m communication system and the DL-MAP message transmitted from a specific frame located behind a single frame from a current frame (i.e., frame 2) will transmit the 16m system information. At step S73, the mobile station (MS) receives the DL-MAP message having no 16m system information, with the same manner as in the above step S71.

At step S74, the mobile station (MS) receives the FCH signal in the same manner as in the above step S70. Compared with the above step S70, there is a difference in 'Count' value between steps S74 and S70. In more detail, the 'Count' value transmitted at the above step S74 is reduced by '1' as compared with the 'Count' value of the FCH signal of the above step S72, such that the 'Count' value of the above step S74 is set to '0'. As the mobile station (MS) receives the FCH signal in which the 16m_Support_Indicator field is set to "16m_Support_Indicator ==0b1" and the 'Count' field is set to "count==0", the mobile station (MS) recognized that the base station (BS) supports the 16m communication system and that the DL-MAP message transmitted from the current frame (i.e., frame 3) includes 16m system information.

At step S76, the mobile station (MS) receives the DCD, UCD, and/or UL-MAP messages from the base station (BS). At step S77, the mobile station (MS) transmits a message for initial ranging (CDMA ranging code). At step S78, the mobile station (MS) receives a response to the message for initial ranging from the base station (BS). The mobile station (MS) inserts a MAC address information into a ranging request message, and then transmits the ranging request to a base station (BS). Then, the mobile station (MS) gets assigned with a basic management CID and a primary management CID from the base station (BS) by a ranging response message. Above steps are similar to those of FIG. 6.

If the 16m system information is periodically transmitted as shown in the above-mentioned embodiment and the period is not one frame interval, the mobile station (MS) receives the FCH signal using the 'Count' value, such that it can forecast when the DL-MAP message equipped with the 16m system information is transmitted. Therefore, this embodiment can increase the reception (Rx) capability. Also, if the 'Count' value is not equal to '0', the mobile station (MS) powers off or reduces its power until receiving a frame having the 'Count' value of '0', such that power consumption is minimized.

A method for allowing the base station (BS) to transmit the 16m system information to mobile stations using the DCD message according to another embodiment of the present invention will hereinafter be described in detail.

The following table 4 shows an example of the DL_Frame_Prefix message, which includes specific information indicating whether the base station (BS) supports the 16m system. The DL_Frame_Prefix message shown in Table 4 can be used in the remaining methods other than the above-mentioned DL-MAP associated method.

TABLE 4

| Syntax | Size | Notes |
|---|---|---|
| DL_Frame_Prefix_format( ){ | | |
| Used subchannel bitmap | 6 bits | Bit #0: Subchannels 0-11 are used |
| | | Subchannel group 0 |
| | | Bit #1: Subchannels 12-19 are used |
| | | Subchannel group 1 |
| | | Bit #2: Subchannels 20-31 are used |
| | | Subchannel group 2 |
| | | Bit #3: Subchannels 32-39 are used |
| | | Subchannel group 3 |
| | | Bit #4: Subchannels 40-51 are used |
| | | Subchannel group 4 |
| | | Bit #5: Subchannels 52-59 are used |
| | | Subchannel group 5 |
| 16m_Support_Indicator | 1 bits | 0b0: BS shall not supports 16m |
| | | 0b1: BS shall supports 16m |
| Repetition_Coding_Indication | 2 bits | 0b00: No repetition coding on DL-MAP |
| | | 메시지 |
| | | 0b01: Repetition coding of 2 used on DL-MAP message |
| | | 0b10: Repetition coding of 4 used on DL-MAP message |
| | | 0b11: Repetition coding of 6 used on DL-MAP message |
| Coding_Indication | 3 bits | 0b000: CC encoding used on DL-MAP message |
| | | 0b001: BTC encoding used on DL-MAP message |
| | | 0b010: CTC encoding used on DL-MAP message |
| | | 0b011: ZT CC encoding used on DL-MAP message |
| | | 0b100: CC encoding with optional interleaver |
| | | 0b101: LDPC encoding used on DL-MAP message |
| | | 0b101 0b110 to 0b111 - Reserved |
| DL-MAP message Length | 8 bits | |
| Reserved | 4 bits | |
| } | | |

As described above, the 16m mobile station (MS) first searches for a preamble using frequency information and bandwidth information to access a network. The 16m mobile station (MS) can acquire a downlink synchronization setup, channel estimation, and a cell ID from the preamble. The mobile station (MS) receives channel information and coding information associated with the DL-MAP message over the FCH channel. In this case, the mobile station (MS) can receive specific information indicating whether the base station (BS) supports the 16m system over the FCH channel. The DL_Frame_Prefix signal of Table 4 is different from the DL_Frame_Prefix signal of Table 1 in that a 'Count' field is not defined when the base station (BS) supports the 16m system. This is because the DCD message is a periodically transmitted message and thus system information can be transmitted an appropriate number of times without 'Count' field.

A base station (BS) can deliver 16m system information using DCD/UCD messages in broadcast format. The following table 5 shows an exemplary DCD message including 16m system information.

TABLE 5

| Syntax | Size | Notes |
|---|---|---|
| DCD_Message_Format( ) { | | |
| Management Message Type = 1 | 8 bits | |
| M Configuration Change Count | 8 bits | If BS does not support the 16m, these bits shall be set to zero |
| Configuration Change Count | 8 bits | |
| TLV Encoded information for the overall channel | 8 bits variable | TLV specific |
| Begin PHY Specific Section { | | See applicable PHY subclause |
| For ( i=1; i <= n; i++) { | | For each downlink burst |
| Downlink_Burst_Profile | | profile 1 to n PHY_specific |
| } | | |
| } | | |
| } | | |

As can be seen from Table 5, the base station (BS) includes the 16m system information in the DCD message, such that it can transmit the resultant DCD message. According to this embodiment, if it is determined that the base station (BS) supports the 16m system over the FCH channel, the 16m mobile station (MS) can read the 16m system information when receiving the DCD message. In this method, as described above, the base station (BS) includes the DL_frame_prefix format as like shown in Table 1 or 4 in the FCH signal.

As can be seen from Table 1, the DL-MAP message is transmitted at each frame. If the DL-MAP message is not transmitted each frame or is periodically transmitted, a 'Count' field is defined and a 'Count' value is transmitted. According to this embodiment which uses the periodically-transmitted DCD message, if the 16m system information is not contained in all the Tx DCD messages, the 'Count' field is defined in the DCD message of Table 5, and the count information can also be used. According to this embodiment of the present invention, the DCD message is configured in the form of a TLV format as defined in the following Tables 6 and 7, and includes the 16m system information, such that it indicates the 16m system information via the DCD message.

The DCD message of Table 5 defines M number of Configuration Change Count fields to indicate 16m system information and the change of the 16m system information, such that it may include the configuration change count information for the 16m system. If the base station (BS) does not support the 16m system, "M Configuration Change Count field" may be set to '0'.

The following tables 6 and 7 show exemplary TLV values used when the 16m system information is transmitted via the DCD message.

TABLE 6

| Name | Type | Length (1 byte) | Value |
|---|---|---|---|
| 16m_PHY_Info | x | variable | See Table 7 |

TABLE 7

| Item | Size | Notes |
|---|---|---|
| 16m Frequency | 32 bits | 16m Downlink center frequency (kHz) |
| 16m Number of band | 8 bits | The number of bandwidth |
| 16m Preamble Index | 8 bits | This parameter defines the PHY specific preamble |
| 16m Base Bandwidth | 8 bits | Channel BW in units of 125 kHz |
| 16m FFT Size | 2 bits | 0b00 = 2048 |
| | | 0b01 = 1024 |
| | | 0b10 = 512 |
| | | 0b11 = 128 |
| 16m Cycle prefix (CP) | 2 bits | 0b00 = ¼ |
| | | 0b01 = ⅛ |
| | | 0b10 = 1/16 |
| | | 0b11 = 1/32 |
| 16m Frame duration code | 4 bits | 0b0000 = 2.0 ms |
| | | 0b0001 = 2.5 ms |
| | | 0b0010 = 4 ms |
| | | 0b0011 = 5 ms |
| | | 0b0100 = 8 ms |
| | | 0b0101 = 10 ms |
| | | 0b0110 = 12.5 ms |
| | | 0b0111 = 20 ms |
| | | 0b1000-0b1111 = Reserved |

As can be seen from Table 7, it can be recognized that the 16m system information includes "Frequency", "Number of band", "Preamble Index", "Base Bandwidth", "FFT Size", "Cycle prefix", "Frame duration code", etc. Transmission (Tx) information of individual fields can be easily recognized by explanations shown in Table 3. The base station (BS) may have the DCD message include the TLV data including the above 16m information of Tables 6 and 7, and inform the 16m system information using the DCD message. In the same manner as in Table 3, the 16m system information can be added, deleted or modified as necessary. Also, the TLV size contained in the DCD message may be changed according to TLV construction information.

Figure 8:
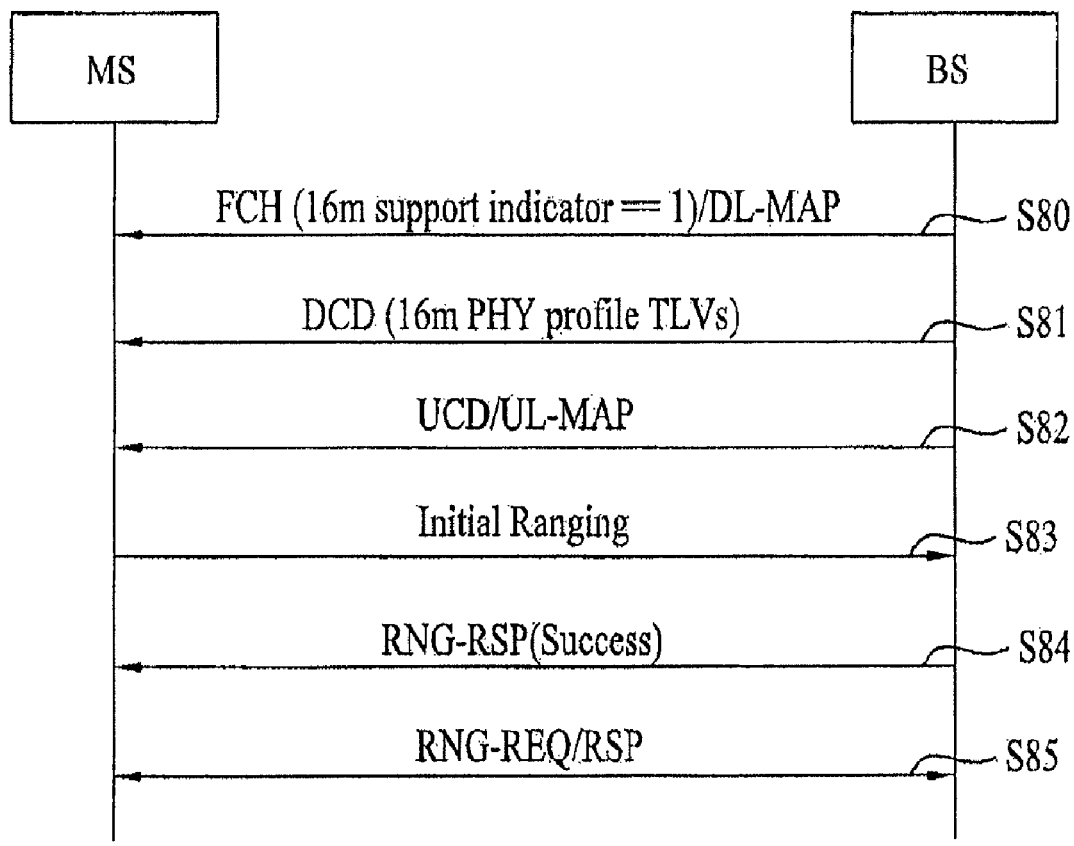
FIG. 8 is a flow chart illustrating a method for using the DCD message according to one embodiment of the present invention.

FIG. 8 is a flow chart illustrating a method for using the DCD message according to one embodiment of the present invention.

FIG. 8 illustrates a flow by which a 16m mobile station (MS) acquires 16m system information while a 16m mobile station (MS) performs a procedure to enter a 16m network supporting 16e system. The base station (BS) of FIG. 8 transmits 16m system information to the mobile station using the DCD message.

First, at step S80, the mobile station (MS) checks the 16e frequency band to detect the preamble, and receives the FCH signal. The mobile station (MS) checks the "16m_Support_Indicator" field of the received FCH signal, and determines whether the 16m communication system is supported or not. In this case, if the 16m communication system is supported as shown in Tables 1 and 4, the "16m_Support_Indicator" field is set to '1'. Otherwise, if the 16m communication system is not supported, the "16m_Support_Indicator" field is set to '0'. Therefore, if the mobile station (MS) receives the FCH signal equipped with "16m_Support_Indicator =0b1", the mobile station (MS) receiving the above FCH signal can recognize that the base station (BS) supports the 16m communication system and the DL-MAP message transmitted from a current frame (i.e., frame 1) includes the 16m system information. And, the mobile station (MS) receives the DL-MAP message, such that it can acquire the downlink channel resource allocation information.

At step S81, the mobile station (MS) receives a DCD message containing the 16m system information from the base station (BS). In this case, the DCD message may use the format of Table 5. In other words, as described above, the TLV data containing the 16m information of Tables 6 and 7 is included in the DCD message, such that the base station (BS) may inform the mobile station (MS) of the 16m system information using the DCD message. The mobile station (MS) can acquire the 16m system information via the DCD message.

The mobile station (MS) receives the UCD and/or UL-MAP message from the base station (BS) at step S82, transmits the initial ranging message at step S83, and receives the response message of the initial ranging message from the base station (BS) at step S84. Similar to FIG. 6, the mobile station (MS) of FIG. 8 contains the MAC addresses in the ranging request message, transmits the resultant ranging request message to the base station (BS), and receives a basic management CID and a primary management CID via the ranging response message.

A method for allowing the mobile station (MS) to receive the 16m system information from the base station (BS) using the RNG-REQ/RSP messages during the ranging process between the mobile station (MS) and the base station (BS) according to another embodiment of the present invention will hereinafter be described in detail.

When the mobile station (MS) performs the ranging process with the 16m base station (BS), the mobile station (MS) informs the base station (BS) whether the mobile station (MS) supports the 16m systems or not. If the base station (BS) determines that the mobile station (MS) supports the 16m system, the base station (BS) transmits the 16m system information to the mobile station (MS) via the RNG-RSP message.

The following table 8 shows an example of the 16m support indication TLV message which can be contained in the ranging request message (RNG-REQ).

TABLE 8

| Name | Type | Length (1 byte) | Value |
| --- | --- | --- | --- |
| 16m Support Indication | x | 1 | Bit #0: 16m support indication (when this bit is set to 1, the MS supports 16m) Bits 1-7: Reserved |

During the ranging process, the mobile station (MS) can acquire the 16m system information. The mobile station (MS) checks the 16e frequency band, detects the preamble, and reads the FCH signal, such that it can determine whether the base station (BS) supports the 16m system. If the mobile station (MS) determined that the base station (BS) supports the 16m system, the mobile station (MS) informs the base station (BS) whether the mobile station (MS) can support the 16m system during the ranging process. For this purpose, when the RNG-REQ message is transmitted, the mobile station (MS) contains specific information indicating whether the mobile station (MS) supports the 16m system in the RNG-REQ message. In this case, in order to include specific information indicating whether the 16m system is supported in the RNG-REQ message, the 16m support indication TLV message or the MAC version encoding TLV message of Table 8 is defined. The defined message of Table 8 is contained in the RNG-REQ message, such that the mobile station (MS) can transmit the RNG-REQ message to the base station (BS). If the base station (BS) recognizes that the mobile station (MS) supports the 16m system information during the ranging process, the base station (BS) includes the 16m-associated information in the RNG-RSP message and transmits the resultant RNG-RSP message to the mobile station (MS).

If the bit #0 of the 16m_Support Indication TLV message contained in the RNG-REQ message received from the mobile station (MS) is set to '1', the base station (BS) determines that the mobile station (MS) transmitting the ranging request message supports the 16m system, and then transmits a RNG-RSP message including TLV-formatted 16m system information. In this case, the TLV format contained in the RNG-RSP message is shown in the following Table 9.

TABLE 9

| Name | Type | Length (1 byte) | Value |
| --- | --- | --- | --- |
| 16m_PHY_Info | x | variable | See Table 7 |

In a form of TLV shown in Table 9, a RNG-RSP message may be transmitted with including 16m system information. As can be seen from Table 9, an example of the detailed system information can be readily recognized by the above table 7 and a detailed description of the above table 7. In other words, "Frequency", "Number of band", "Preamble Index", "Base bandwidth", "FFT Size", "Cycle prefix" and "Frame duration code" fields may be contained in the 16m system information.

Figure 9:
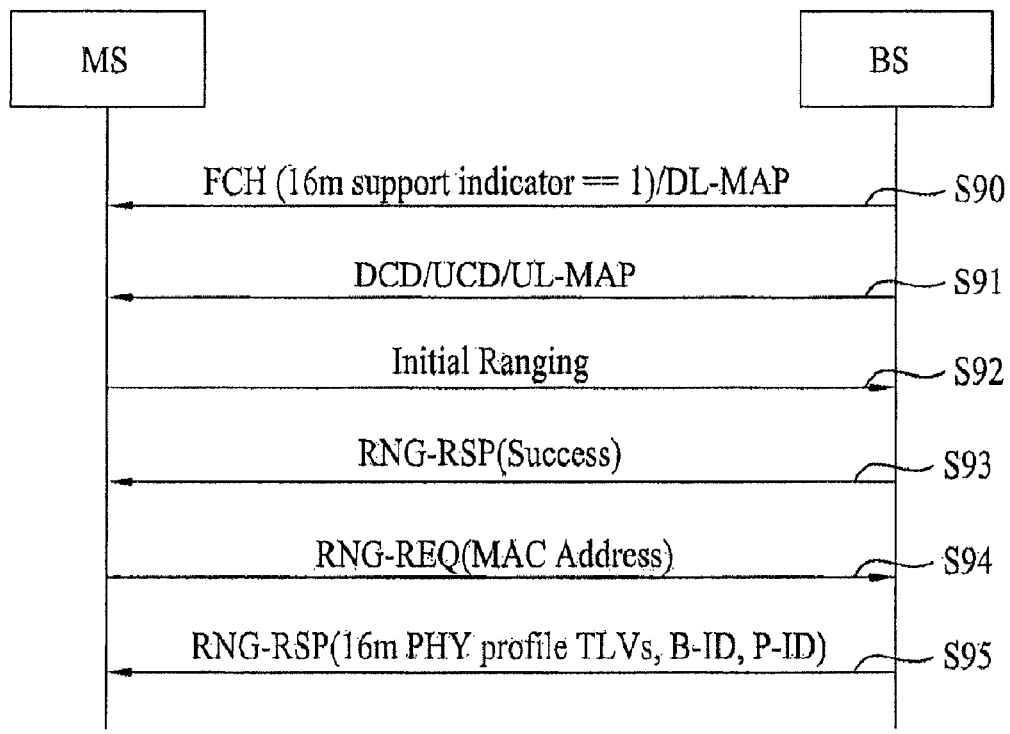
FIG. 9 is a flow chart illustrating a method for using the RNG-REG/RSP message according to one embodiment of the present invention.

FIG. 9 is a flow chart illustrating a method for using the RNG-REG/RSP message according to one embodiment of the present invention.

During the network entry process between the 16m mobile station (MS) and the 16m base station (BS) supporting the 16e system, FIG. 9 shows another method for acquiring the 16m system information from the base station (BS). The base station (BS) of FIG. 9 transmits the 16m system information to the mobile station using the RNG-RSP message.

Firstly, at step S90, the mobile station (MS) checks the 16e frequency band to detect the preamble, and receives the FCH signal. The mobile station (MS) checks the "16m_Support_Indicator" field of the received FCH signal, and determines whether the 16m communication system is supported or not. In this case, if the 16m communication system is supported as shown in Tables 1 and 4, the "16m_Support_Indicator" field is set to '1'. Otherwise, if the 16m communication system is not supported, the "16m_Support_Indicator" field is set to '0'. Therefore, if the mobile station (MS) receives the FCH signal equipped with "16m_Support_Indicator=0b1" and "count=0", it can be recognized that the base station (BS) supports the 16m communication system. And, the mobile station (MS) receives the DL-MAP message, such that it can acquire the downlink channel resource allocation information.

The mobile station (MS) receives the DCD, UCD and/or UL-MAP message from the base station (BS) at step S91, transmits the initial ranging message at step S92, and receives the successful response message of the initial ranging message from the base station (BS) at step S93.

The mobile station (MS) contains specific information indicating whether the 16m system is supported in the RNG-REQ message, and transmits the resultant RNG-REQ message at step S94. In this case, the above-mentioned specific information is configured in the form of 16m support indication TLV format, and is then contained in the RNG-REQ message, such that the mobile station (MS) transmits the above-mentioned specific information to the base station (BS). In this case, the above-mentioned 16m support indication TLV format of Table 8 can be used.

The base station (BS) receives the RNG-REQ message equipped with the above-mentioned specific information, transmits the RNG-RSP message acting as a response to the RNG-REQ message to the mobile station (MS). In this case, the 16m system information is also transmitted to the mobile station (MS). In this case, the 16m system information is configured in the form of a TLV format, and is then contained in the RNG-RSP message. This fact can be readily recognized by Table 9 and a detailed description of the Table 9.

A method for allowing the mobile station (MS) to receive the 16m system information from the base station (BS) using the SBC-REQ/RSP message when the mobile station (MS) requests the basic capability from the base station (BS) according to another embodiment of the present invention will hereinafter be described in detail.

When the mobile station (MS) requests the basic capability from the base station (BS), it informs the base station (BS) whether it supports the 16m system. If it is determined that the mobile station (MS) supports the 16m system, the base station (BS) transmits the 16m system information acting as a response to the received message to the mobile station (MS).

The following table 10 shows an example of the 16m support Indication TLV which can be contained in the basic capability request (SBC-REQ) message.

TABLE 10

| Name | Type | Length (1 byte) | Value |
|---|---|---|---|
| 16m Support Indication | x | 1 | Bit #0: 16m support indication (when this bit is set to 1, the MS supports 16m) Bits 1-7: Reserved |

When the mobile station (MS) performs the basic capability negotiation, it can acquire the 16m system information from the base station. After performing the ranging process, the mobile station (MS) negotiates with the base station (BS) about the basic capability upon transmitting/receiving the SBC-REQ/RSP message. During the basic capability negotiation, the mobile station (MS) contains the TLV-formatted specific information, indicating whether the 16m system is supported, in the SBC-REQ message. In this case, the specific information indicating whether the 16m system is supported may be defined in the form of 16m support indication TLV, such that the resultant information may then be used.

If the bit #0 of the 16m Support Indication TLV message contained in the SBC-REQ message received from the mobile station (MS) is set to '1', the base station (BS) determines that the mobile station (MS) supports the 16m system, and the TLV-formatted 16m information is contained in the SBC-RSP message, such that the resultant message is transmitted to the mobile station (MS). In this case, the TLV format contained in the SBC-RSP message is shown in the following Table 11.

TABLE 11

| Name | Type | Length (1 byte) | Value |
|---|---|---|---|
| 16m_PHY_Info | x | Variable | See Table 7 |

As can be seen from Table 11, the 16m system information configured in the form of the TLV format may be contained in the SBC-RSP message, and may be transmitted to a destination. As can be seen from Table 9, exemplary detailed information can be recognized by Table 7 and its detailed description. In other words, "Frequency", "Number of band", "Preamble Index", "Base bandwidth", "FFT Size", "Cycle prefix" and "Frame duration code" fields may be contained in the 16m system information.

Figure 10:
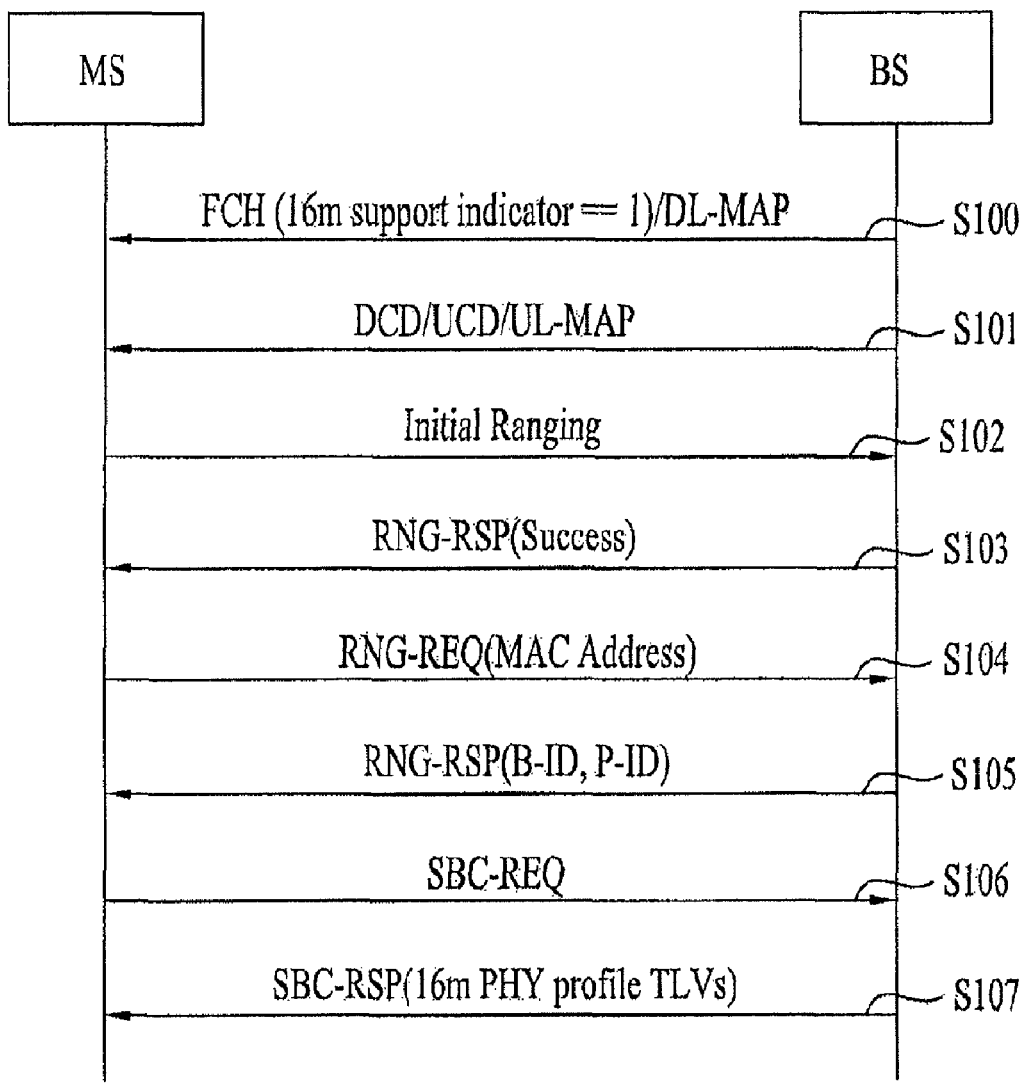
FIG. 10 is a flow chart illustrating a method for using the SBC-REQ/RSP message according to one embodiment of the present invention.

FIG. 10 is a flow chart illustrating a method for using the SBC-REQ/RSP message according to one embodiment of the present invention.

During the network entry process between the 16m mobile station (MS) and the 16m base station (BS) supporting the 16e system, FIG. 10 shows another method for acquiring the 16m system information from the base station (BS). After the ranging process has been conducted, the mobile station (MS) of FIG. 10 can acquire the 16m system information from the base station (BS) using the SBC-REQ/RSP message during the basic capability negotiation.

Firstly, at step S100, the mobile station (MS) checks the 16e frequency band to detect the preamble, and receives the FCH signal. The mobile station (MS) checks the "16m_Support_Indicator" field of the received FCH signal, and determines whether the 16m communication system is supported or not. In this case, if the 16m communication system is supported as shown in Tables 1 and 4, the "16m_Support_Indicator" field is set to '1'. Otherwise, if the 16m communication system is not supported, the "16m_Support_Indicator" field is set to '0'. Therefore, if the mobile station (MS) receives the FCH signal equipped with "16m_Support_Indicator=0b1" and "count=0", it can be recognized that the base station (BS) supports the 16m communication system. And, the mobile station (MS) receives the DL-MAP message, such that it can acquire the downlink channel resource allocation information.

The mobile station (MS) receives the DCD, UCD and/or UL-MAP message from the base station (BS) at step S101, transmits the initial ranging message at step S102, and receives the successful response message of the initial ranging message from the base station (BS) at step S103. The mobile station (MS) transmits the RNG-REQ message to the base station (BS) at step S104, and receives the RNG-RSP message acting as a response to the RNG-REQ message at step S105.

The mobile station (MS) contains specific information indicating whether the 16m system is supported in the SBC-REQ message, and transmits the resultant RNG-REQ message at step S106. In this case, the above-mentioned specific information is configured in the form of 16m support indication TLV format, and is then contained in the SBC-REQ message, such that the mobile station (MS) transmits the above-mentioned specific information to the base station (BS). In this case, the above-mentioned 16m support indication TLV format of Table 10 can be used.

The base station (BS) receives the SBC-REQ message equipped with the above-mentioned specific information, transmits the SBC-RSP message acting as a response to the SBC-REQ message to the mobile station (MS). In this case, the 16m system information is also transmitted to the mobile station (MS). In this case, the 16m system information is configured in the form of a TLV format, and is then contained in the SBC-RSP message. This fact can be readily recognized by Table 11 and a detailed description of the Table 11.

A method for allowing the mobile station (MS) to receive the 16m system information from the base station (BS) using the 16m_INFO-REQ/RSP message when the mobile station (MS) requests the 16m system information from the base station (BS) according to another embodiment of the present invention will hereinafter be described in detail.

When the mobile station (MS) requests the 16m system information from the base station (BS), it informs the base station (BS) whether it supports the 16m system. If it is determined that the mobile station (MS) supports the 16m system, the base station (BS) transmits the 16m system information acting as a response to the received message to the mobile station (MS).

The following tables 12 and 13 show examples of "16m_INFO-REQ" and "16m_INFO-RSP" messages, each of which can transmit the 16m system information.

TABLE 12

| Syntax | Size | Notes |
|---|---|---|
| 16m_INFO-REQ message format( ) { | | |
| Management message type = xx | 8 bits | |
| TLV Encoded Information | variable | TLV specific |
| } | | |

TABLE 13

| Syntax | Size | Notes |
|---|---|---|
| 16m_INFO-RSP message format( ) { | | |
| Management message type = xx | 8 bits | |
| TLV Encoded Information | variable | TLV specific |
| } | | |

The mobile station (MS) can acquire the 16m system information from the base station (BS) via the 16m_INFO-REQ message which requests the 16m system information. After the mobile station (MS) registers the 16e system in the base station (BS), it transmits the 16m_INFO-REQ message of Table 12 to the base station (BS), such that it requests the 16m system information from the base station (BS). The base station (BS) transmits the response message acting as the response to the 16m_INFO_REQ message to the 16m_INFO-RSP message of Table 13 to the mobile station (MS). The format and contents of the TLV message contained in the 16m_INFO-RSP are equal to those of Tables 6 and 7. Thereafter, if the additional information transmission is requested by the 16m_INFO-REQ message of Table 12, the TLV format may also be configured and transmitted as necessary.

The base station (BS) may voluntarily transmit the 16m system information to the mobile station (MS) before the mobile station (MS) transmits a request signal (i.e., although the base station (BS) does not receive the 16m_INFO-REQ message). Otherwise, before the mobile station (MS) finishes the initial network entry process, it may acquire the 16m system information from the base station (BS) using the above-mentioned 16m_INFO-REQ/RSP message.

Figure 11:
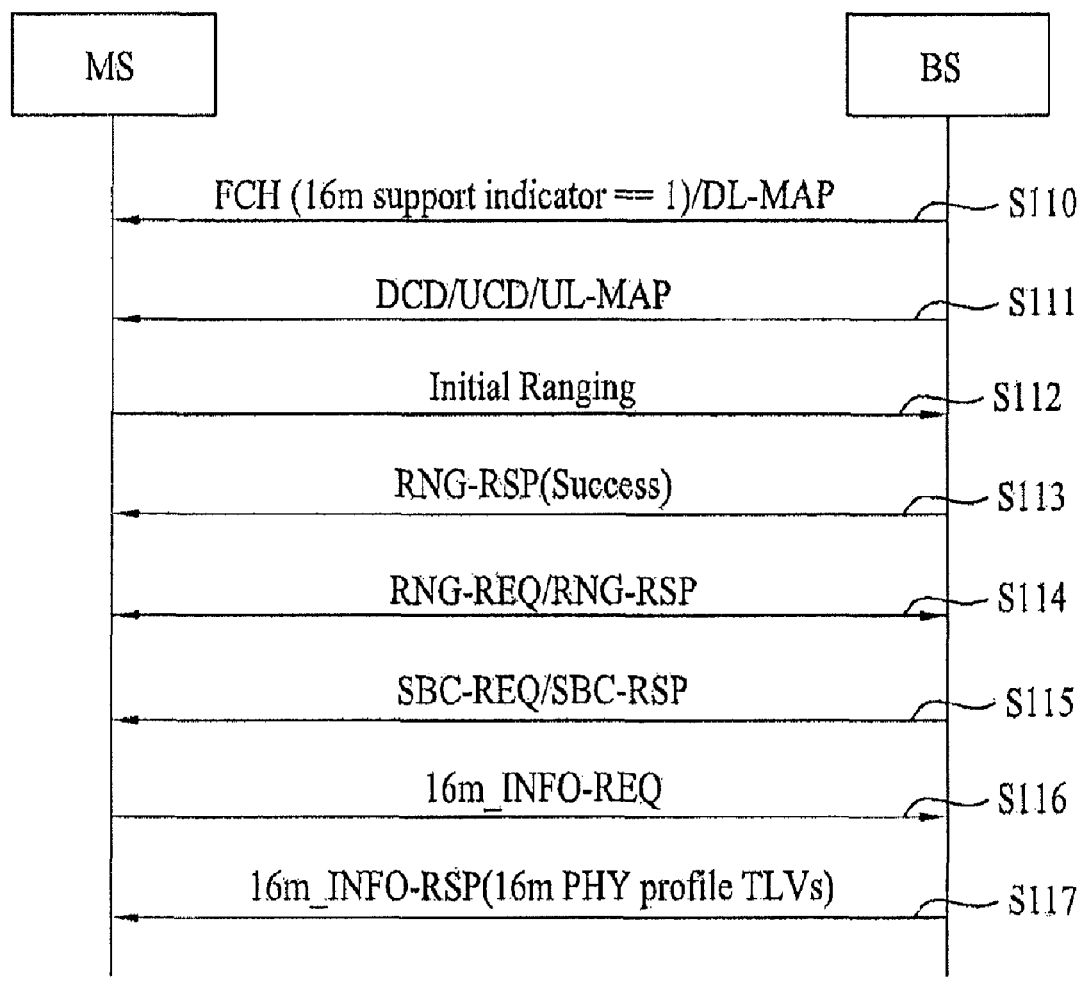
FIG. 11 is a flow chart illustrating a method for using the 16m_INFO-REQ/RSP message according to one embodiment of the present invention.

FIG. 11 is a flow chart illustrating a method for using the 16m_INFO-REQ/RSP message according to one embodiment of the present invention.

In more detail, as can be seen from FIG. 11, after the 16m mobile station (MS) and the 16m base station supporting the 16e system perform the network entry process, the 16m mobile station (MS) acquires the 16m system information. However, this embodiment may also be executed before the initial network entry process is completed. The mobile station (MS) performs the network entry process, and may acquire the 16m system information from the base station (BS) using the 16m_INFO-REQ/RSP message.

Firstly, at step S110, the mobile station (MS) checks the 16e frequency band to detect the preamble, and receives the FCH signal. The mobile station (MS) checks the "16m_Support_Indicator" field of the received FCH signal, and determines whether the 16m communication system is supported or not. In this case, if the 16m communication system is supported as shown in Tables 1 and 4, the "16m_Support_Indicator" field is set to '1'. Otherwise, if the 16m communication system is not supported, the "16m_Support_Indicator" field is set to '0'. Therefore, if the mobile station (MS) receives the FCH signal equipped with "16m_Support_Indicator=0b1", it can be recognized that the base station (BS) supports the 16m communication system. And, the mobile station (MS) receives the DL-MAP message, such that it can acquire the downlink channel resource allocation information.

The mobile station (MS) receives the DCD, UCD and/or UL-MAP message from the base station (BS) at step S111, transmits the initial ranging message at step S112, and receives the successful response message of the initial ranging message from the base station (BS) at step S113. The mobile station (MS) transmits/receives the RNG-REQ/RSP message to/from the base station (BS) at step S114, such that it performs the ranging process. The SBC-REQ/RSP messages are communicated between the mobile station (MS) and the base station (BS), such that the basic capability is negotiated at step S115.

The mobile station (MS) contains specific information indicating whether the 16m system is supported in the 16m_INFO-REQ message, and transmits the resultant 16m_INFO-REQ message at step S116. In this case, the above-mentioned specific information is configured in the form of 16m support indication TLV format, and is then contained in the 16m_INFO-REQ message, such that the mobile station (MS) transmits the above-mentioned specific information to the base station (BS). In this case, the above-mentioned 16m_INFO-REQ message of Table 12 can be used.

The base station (BS) receives the 16m_INFO-REQ message equipped with the above-mentioned specific information, transmits the 16m_INFO-RSP message acting as a response to the 16m_INFO-REQ message to the mobile station (MS). In this case, the 16m system information is also transmitted to the mobile station (MS). In this case, the 16m system information is configured in the form of a TLV format, and is then contained in the 16m_INFO-RSP message. This fact is similar to that of the above Table 11.

A method for allowing the mobile station (MS) to receive the 16m system information from the base station (BS) using the authentication message for data exchange according to another embodiment of the present invention will hereinafter be described in detail. In this case, it should be noted that the above-mentioned data exchange relates to a specific authentication, an authority assignment, a key management, etc.

The mobile station (MS) can acquire the 16m system information from the base station (BS) while it transmits/receives the authentication message (e.g., PKM-REQ/RSP message) to/from the base station (BS).

The following table 14 shows examples of the 16m system information request messages capable of being transmitted by which the PKM message.

TABLE 14

| Code | PKM message Type | MAC management message name |
|---|---|---|
| ... | ... | ... |
| 35 | 16m system information request | PKM-REQ |
| 36 | 16m system information request | PKM-RSP |
| 37-255 | reserved | |

The following table 14 shows a variety of 16m system information request messages capable of being transmitted by the PKM message, codes corresponding to individual PKM message types, and MAC management message names of individual PKM message types.

For example, as shown in Table 14, the code 35 indicates that the PKM message type requests 16 system information and a MAC management message name of the PKM message is a PKM-REQ. The code 36 indicates that the PKM message type answers the 16m system information request and a MAC management message name of the PKM message is a PKM-RSP.

The following Tables 15 and 16 show examples of 16m_INFO-REQ and 16m_INFO-RSP messages, each of which can transmit the 16m system information.

TABLE 15

| Syntax | Size | Notes |
|---|---|---|
| PKM-REQ message format( ) { | | |
| Management message type = 9 | 8 bits | |
| Code | 8 bits | 16 bits system information request |
| PKM identifier | 8 bits | Compared with PKM identifier of the response message |
| } | | |

TABLE 16

| Syntax | Size | Notes |
|---|---|---|
| PKM-RSP message format( ) { | | |
| Management message type = 10 | 8 bits | |
| Code | 8 bits | 16 bits system information response |
| PKM identifier | 8 bits | |
| TLV Encoded Information | variable | TLV specific |
| } | | |

When the mobile station (MS) registers the 16e information in the base station (BS) or after the mobile station (MS) registers the same in the base station (BS), the mobile station (MS) transmits the PKM-REQ message of Table 15 to the base station (BS), such that it requests the 16m system information from the base station (BS). The base station (BS) transmits the PKM-RSP message of Table 16 to the mobile station (MS) as a response to the PKM-REQ message. The PKM-RSP message includes the 16m PHY profile TLV message of the above tables 6 and 7. IT should be noted that the format and contents of the TLV message contained in the PKM-RSP message are equal to those of Tables 6 and 7.

Figure 12:
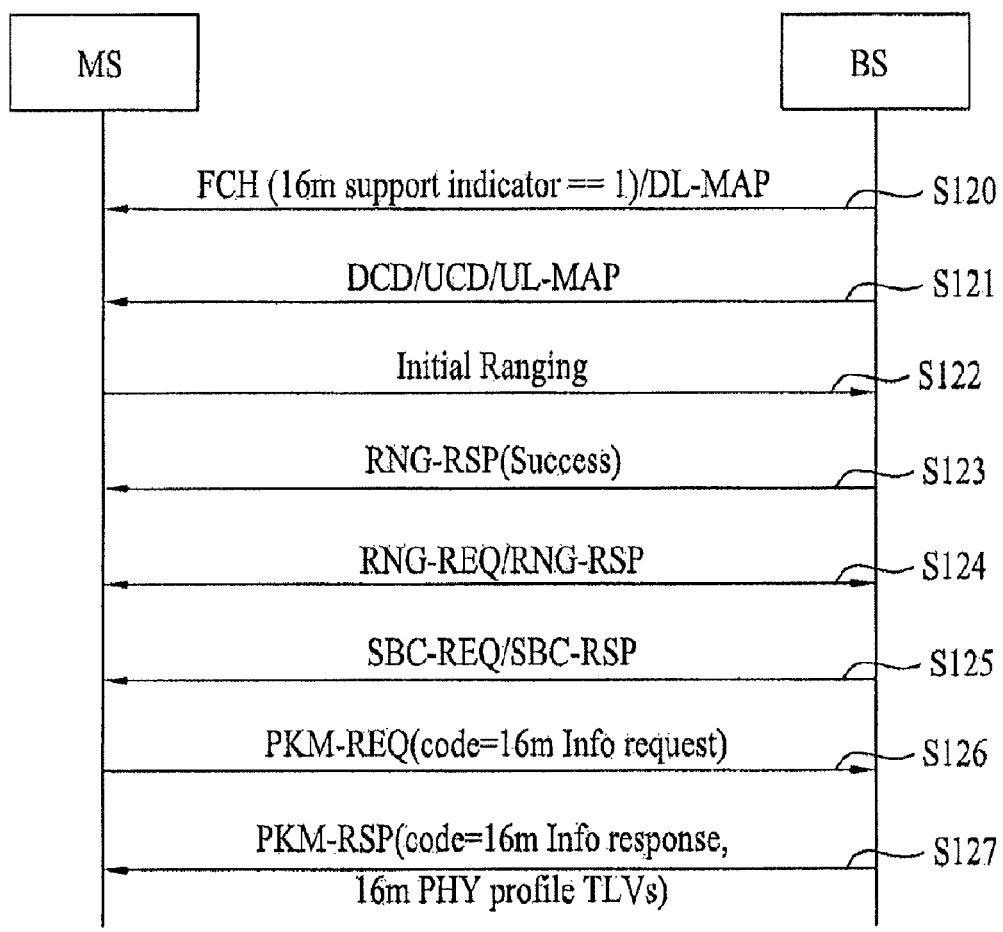
FIG. 12 is a flow chart illustrating a method for using the PKM message according to one embodiment of the present invention.

FIG. 12 is a flow chart illustrating a method for using the PKM message according to one embodiment of the present invention.

In more detail, as can be seen from FIG. 12, when the 16m mobile station (MS) and the 16m base station supporting the 16e system perform the network entry process, the 16m mobile station (MS) acquires the 16m system information.

After the mobile station (MS) performs the network entry process, it may acquire the 16m system information from the base station (BS) using the PKM-REQ/RSP message.

Firstly, at step S120, the mobile station (MS) checks the 16e frequency band to detect the preamble, and receives the FCH signal. The mobile station (MS) checks the "16m_Support_Indicator" field of the received FCH signal, and determines whether the 16m communication system is supported or not. In this case, if the 16m communication system is supported as shown in Tables 1 and 4, the "16m_Support_Indicator" field is set to '1'. Otherwise, if the 16m communication system is not supported, the "16m_Support_Indicator" field is set to '0'. Therefore, if the mobile station (MS) receives the FCH signal equipped with "16m_Support_Indicator ==0b1", it can be recognized that the base station (BS) supports the 16m communication system. And, the mobile station (MS) receives the DL-MAP message, such that it can acquire the downlink channel resource allocation information.

The mobile station (MS) receives the DCD, UCD and/or UL-MAP message from the base station (BS) at step S121, transmits the initial ranging message at step S122, and receives the successful response message of the initial ranging message from the base station (BS) at step S123. The mobile station (MS) transmits/receives the RNG-REQ/RSP message to/from the base station (BS) at step S124, such that it performs the ranging process. The SBC-REQ/RSP messages are communicated between the mobile station (MS) and the base station (BS), such that the basic capability is negotiated at step S125.

After the basic capability negotiation is completed, the mobile station (MS) may request the 16m system information from the base station (BS) using the authentication message at step S126. In order to request the 16m system information, the mobile station (MS) transmits the PKM-REQ message equipped with the 16m system information request code to the base station (BS).

The base station (BS) transmits the PKM-RSP message acting as a response to the PKM-REQ message to the mobile station (MS) at step S127. In this case, the 16m system information is contained in the PKM-RSP message, and is then transmitted to the mobile station (MS). In this case, the 16m system information is configured in the form of a TLV format, and is then contained in the PKM-RSP message, and this resultant message of Table 13 may be used.

By the above-mentioned embodiments, the present invention enables the mobile station (MS) to access the 16e base station (BS) from the other base station (BS) capable of supporting the 16m and 16e systems, such that it can acquire 16m system information. As a result, the mobile station (MS) can be correctly operated with the base station (BS). Specifically, if the mobile station (MS) acquires the 16m system information from the base station (BS) using the unicast scheme (e.g., RNG-RSP, SBC-RSP, 16m_INFO-RSP, or PKM-RSP), the present invention can prevent the occurrence of periodic resource consumption caused by the broadcast scheme (DL-MAP or DCD, etc.).

The above-mentioned embodiments have described various methods for transmitting the 16m system information to the mobile station (MS) using various messages. A method for indicating the changed system information which can be simultaneously or independently used will hereinafter be described in detail.

Differently from the conventional method for periodically indicating the system information using the DL-MAP message or the DCD/UCD message at each frame, if the 16m system information is transmitted to the mobile station (MS) according to the unicast scheme, the mobile station (MS) is unable to acquire the changed system information when the 16m system information is changed. In this case, if the 16m- associated information is changed to another, the base station (BS) may voluntarily inform the mobile station (MS) of the changed information. Preferably, the base station (BS) may transmit the changed information to only some mobile stations registered in the 16m system.

The following table 17 shows an example of "16m_INFO-Change" message which is transmitted from the base station (BS) to the mobile stations on the condition that the 16m system information has been changed.

TABLE 17

| Syntax | Size | Notes |
| --- | --- | --- |
| 16m_INFO-Change_Message_Format( ) { Management message type = xx TLV Encoded Information } | 8 bits variable | TLV specific |

As can be seen from Table 17, the changed information will be configured in the form of a TLV message, and be then contained in the 16m_INFO-Change message, as shown in Tables 6 and 7. If the mobile station (MS) receives the 16m system information change message, it updates the 16m system information with a new value.

The mobile stations may use the broadcast, multicast, and unicast schemes to receive the above-mentioned 16m system information change message in the same manner as in the 16m system information transmission. In this case, if the number of mobile stations registered in the 16m system is at least '1', the broadcast or multicast scheme in which the entire data can be transmitted at one time is more effective than the unicast scheme. If the base station (BS) transmits the 16m system information change message according to the broadcast scheme, the broadcast ID may be used. Also, if the base station (BS) transmits the 16m system information change message according to the multicast scheme, the multicast ID may be used. If the base station (BS) transmits the 16m system information via the 16m dedicated frequency band, it is more preferable that the base station (BS) uses the broadcast scheme instead of the multicast or unicast scheme.

If data transmission is conducted via audible frequencies of the 16e mobile stations, the data is transmitted according to the multicast scheme. For this purpose, the base station (BS) allocates the multicast ID to the 16m mobile stations.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

For example, although the above-mentioned embodiments have been disclosed on the basis of the IEEE 802.16e/m and associated messages, it should be noted that the inventive schemes of the present invention can also be applied to other communication systems and other messages.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

That is, the present patent is not limited to the embodiments described herein and should be interpreted to have the widest range according to the principles and features disclosed herein.

Industrial Applicability

As apparent from the above description, the present invention acquires system information of other communication systems from the initial entry communication system, such that it can enter the other communication systems. The present invention is not limited to only a specific system, and can be applied to not only 3GPP LTE, IEEE 802.16e, and IEEE 802.16m communication systems, but also base stations, switching stations, and mobile stations of various wireless communication systems which can be compatible with the above-mentioned communication systems.

Although the preferred embodiments of the present invention have been disclosed for illustrative purposes, those skilled in the art will understand that various modifications, additions and substitutions are possible, without departing from the scope and spirit of the invention as disclosed in the accompanying claims.

The invention claimed is:

1. A method for receiving system information from a base station (BS) supporting a first communication system and a second communication system, the method comprising:
    searching a frequency band of the first communication system, and receiving a FCH (frame control header) including first information indicating if the second communication system is supported; and
    receiving system information of the second communication system if the first information indicates that the second communication system is supported,
    wherein the system information is received via downlink MAP messages,
    wherein the FCH includes a count value indicating which one of the downlink MAP messages includes the system information, and
    wherein the count value is subtracted by '1' each time any one of the downlink MAP messages is transmitted, and if the count value becomes '0' at a specific frame, the count value is reset to an initial value at a next frame of the specific frame, the initial value being a value other than '0'.

2. The method according to claim 1, wherein the initial value is associated with a transmission (Tx) period of the system information.

3. The method according to claim 1, further comprising:
    receiving the system information via a downlink MAP message of a frame at which the FCH is received if the count value is '0'.

4. The method according to claim 1, wherein the system information is received via at least one of ranging response message, basic capability response message, system information response message, and authentication message.

5. The method according to claim 1, wherein the system information includes at least one of downlink center frequency information, base bandwidth information, information indicating a number of base bandwidths, FFT size information, cyclic prefix information, and frame duration code information, which are used in the second communication system.

6. The method according to claim 1, wherein the system information is transmitted by the base station (BS) using at least one of a broadcast scheme, a multicast scheme, and a unicast scheme.

7. A mobile station configured to receive system information from a base station (BS) supporting a first communication system and a second communication system, the mobile station comprising:
    a processor configured to
        search a frequency band of the first communication system, and receive a FCH (frame control header) including first information indicating if the second communication system is supported, and receive system information of the second communication system if the first information indicates that the second communication system is supported, wherein the system information is received via downlink MAP messages, wherein the FCH includes a count value indicating which one of the downlink MAP messages includes the system information, and wherein the count value is subtracted by '1' each time any one of the downlink MAP messages is transmitted, and if the count value becomes '0' at a specific frame, the count value is reset to an initial value at a next frame of the specific frame, the initial value being a value other than '0'.

* * * * *